United States Patent
Lynn

(10) Patent No.: US 7,406,619 B2
(45) Date of Patent: Jul. 29, 2008

(54) CACHE SYNCHRONIZATION IN A RAID SUBSYSTEM USING SERIAL ATTACHED SCSI AND/OR SERIAL ATA

(75) Inventor: William E. Lynn, Longmont, CO (US)

(73) Assignee: Adaptec, Inc., Milpitas, CA (US)

( * ) Notice: Subject to any disclaimer, the term of this patent is extended or adjusted under 35 U.S.C. 154(b) by 525 days.

(21) Appl. No.: 11/088,395

(22) Filed: Mar. 23, 2005

(65) Prior Publication Data

US 2005/0223270 A1 Oct. 6, 2005

Related U.S. Application Data

(60) Provisional application No. 60/556,409, filed on Mar. 25, 2004.

(51) Int. Cl.
*G06F 11/00* (2006.01)
(52) U.S. Cl. .................. 714/5; 714/6; 714/42; 711/114
(58) Field of Classification Search ............ 714/6, 714/11, 42, 3, 5; 711/114
See application file for complete search history.

(56) References Cited

U.S. PATENT DOCUMENTS

| | | | |
|---|---|---|---|
| 6,202,115 B1 | 3/2001 | Khosrowpour | |
| 6,249,831 B1 | 6/2001 | Allingham | |
| 6,353,895 B1 | 3/2002 | Stephenson | |
| 6,408,358 B1 * | 6/2002 | Uchiyama et al. | 711/114 |
| 6,526,477 B1 | 2/2003 | Yuan et al. | |
| 6,542,960 B1 | 4/2003 | Wong et al. | |
| 6,578,158 B1 * | 6/2003 | Deitz et al. | 714/11 |
| 6,772,270 B1 * | 8/2004 | Kurpanek | 710/316 |
| 6,839,788 B2 * | 1/2005 | Pecone | 710/305 |
| 6,928,509 B2 * | 8/2005 | Surugucchi | 710/316 |
| 6,931,487 B2 * | 8/2005 | Lubbers et al. | 711/114 |
| 6,931,567 B2 * | 8/2005 | Tanaka et al. | 714/6 |
| 7,035,952 B2 * | 4/2006 | Elliott et al. | 710/300 |
| 7,107,320 B2 * | 9/2006 | Busser et al. | 709/213 |
| 2003/0051098 A1 | 3/2003 | Brant et al. | |

OTHER PUBLICATIONS

Definition of "SCSI," retrieved Oct. 26, 2007 from http://en.wikipedia.org.*
ATA-ATAPI.com, "Serial ATA (SATA) and Serial Attached SCSI (SAS)", Internet site printout, Nov. 6, 2003.
SCSI Trade Association, "A SCSI Storage I/O Solution for the Twenty First Century", 2003.

* cited by examiner

*Primary Examiner*—Robert Beausoliel
*Assistant Examiner*—Philip Guyton

(57) ABSTRACT

A RAID system includes a pair of RAID controllers adapted to operate in active-active mode, each controller including a cache memory and at least one SAS/SATA I/O chip connected to a plurality of hard disk drives. Each SAS/SATA I/O chip includes more SAS/SATA ports than required to carry data to the hard drives. The caches in the respective controllers are synchronized via the extra SAS/SATA ports in each controller.

11 Claims, 3 Drawing Sheets

CACHE SYNCHRONIZATION IN A RAID SUBSYSTEM USING SERIAL ATTACHED SCSI AND/OR SERIAL ATA

RELATED APPLICATIONS

This application claims benefit of U.S. Provisional Application No. 60/556,409 filed Mar. 25, 2004 entitled "Cache Synchronization In A Raid Subsystem Using Serial Attached SCSI And/Or Serial ATA".

BACKGROUND OF THE INVENTION

1. Field of the Invention

The present invention relates in general to Redundant Array of Independent Disks (RAID) systems, and in particular to a subsystem such as a RAID controller.

2. Statement of the Problem

RAID (Redundant Array of Independent Disks) storage systems are well known in the art. They provide a high-speed, fault-tolerant hard disk memory. RAID systems protect against the failure of an individual disk drive by distributing the data redundantly over multiple disks. If one disk fails, the data can be recovered from the other disks.

The closest prior art RAID system 100 will be described herein in reference to FIG. 1. RAID system 100 includes a plurality of hard disks 130. A RAID controller 110 is used to control the input and output of a data stream on I/O line 140 to the disks 130. The controller determines to which disks a given packet in the data stream will be written, and retrieves requested data from the correct disk(s). Generally, a controller microprocessor 115 performs this function. To increase the fault tolerance of the storage subsystem, two RAID controllers 110, 120 are used and configured in a redundant manner. Thus, if one controller fails, the other controller can continue to store data in a non-redundant manner at essentially the same speed, or in a redundant manner at slower speed. In the preferred prior art systems, each controller 110, 120 is connected to each of disks 130. In the exemplary RAID system 100 shown, there are twelve disks 130 and each controller 110, 120 has two input/output chips, 111, 112 and 121, 122, respectively. I/O chip 111 in controller 110 is connected to disks 1 through 6 via cabling 150, and I/O chip 112 is connected to disks 7 through 12 via cabling 151; I/O chip 121 in controller 120 is connected to disks 1 through 6 via cabling 154, and I/O chip 122 is connected to disks 7 through 12 via cabling 155. Each cabling system, such as 151, includes appropriate connectors, such as 156 and 157.

In prior art systems 100, the disk I/O system could be any of a large number of prior art communication systems, such as SCCI, SATA, SSA, ATA, FCAL, SAS, etc. I/O chips 111, 112, 121, 122 and cabling systems 150, 151, 154, 155 are determined as known in the art for the protocols for the selected system. In the system 100 shown, a SAS I/Q system has been selected because this results in a system that is closest to the system according to the invention, and therefore makes it easier to understand the invention. In a SAS system, each SAS disk I/O chip, such as 112, includes a plurality of ports, such as 164, each port comprising a transceiver, such as 166. As known in the art, each SAS port 164 is connected via a seven conductor unshielded cable connector, such as 168. As known in the art, four of the wires are two pairs of differential signals, one pair carrying signals in each direction, and three of the wires are ground signals. Prior art controller chips 110, 120 preferably each include a controller chip set 114, 124, respectively; a host I/O chip 117, 127, respectively; and a battery 118, 126, respectively. Each controller, such as 110, also includes appropriate internal electrical connections, such as 148, 149, and 143 as known in the art.

To increase the speed of access to the disk drives, in each controller 110, 120 both read and write data are cached to a controller memory 113, 125, respectively. To increase the overall throughput of the memory subsystem, the two controllers 110, 120 are set up in an active-active configuration in which both controllers simultaneously service storage requests. For two RAID controllers to function completely redundantly in an active-active configuration, the write cache must be synchronized between the two controllers. Thus, if a controller fails during a cached write operation, the other controller has enough information to complete the write operation. To maintain cache synchronization, a link 160 between the two controllers is required. Very high speed is required of this link, since the link must keep up with the flow of data through the system; in essence, this link defines how fast the system can handle data. In the prior art, very high speed is essentially equivalent to high cost. Thus, the cost of this link makes a significant impact on the overall cost of the controller.

In the prior art, the high-speed link between the controllers has been accomplished with either Gigabit Ethernet or Fibre Channel. Both types of links require a specialized chip 116, 128 in each controller to provide the intracontroller communication, plus appropriate wiring and connectors 143, 144, 170 between the links and the controller system; hence, the high cost of the link. Gigabit Ethernet requires four high-speed differential pairs to be routed through the subsystem backplane and provides approximately 90 Mbytes/sec throughput. Fibre Channel only requires two high-speed differential pairs, and can support approximately 200 Mbytes/sec, though it is considerably more expensive than Gigabit Ethernet. It would be a significant advance in the art if a controller could be provided that was as fast or faster than the prior art links and did not add significantly to the cost of the controller.

SOLUTION

The invention solves the above problems, as well as other problems of the prior art, by providing a high-speed link that utilizes chips already part of the controller. That is, a separate, dedicated controller link chip set is not required.

Instead of providing a separate, dedicated controller link, the invention utilizes the system I/O to provide a high-speed cache synchronization link. Preferably, the hard drive I/O is used to provide the cache synchronization link. Preferably, the hard drive I/O comprises a serial attached SCSI (SAS) I/O having more SAS ports in each controller than required to service the hard drives. The extra SAS ports in each controller are used to provide the cache synchronization link. Preferably, each controller includes at least one SAS I/O chip having more ports than required to connect to the hard drives. More preferably, each controller includes a pair of SAS I/O chips, each of the pair of chips having more ports than necessary to communicate with the hard drives. Preferably, one SAS port in each of the chips in each controller is connected to a corresponding SAS port in each of the chips in the other controller. Since generally SAS chips are made with extra ports, the cache link is provided with no additional cost to the controller module.

Preferably, in another embodiment, the hard drive I/O comprises a serial ATA (SATA) I/O having more SATA ports in each controller than required to service the hard drives. The extra SATA ports in each controller are used to provide the cache synchronization link. Preferably, each controller includes at least one SATA I/O chip having more ports than required to connect to the hard drives. More preferably, each controller includes a pair of SATA I/O chips, each of the pair of chips having more ports than necessary to communicate with the hard drives. Preferably, one SATA port in each of the chips in each controller is connected to a corresponding SATA port in each of the chips in the other controller. Since generally SATA chips are made with extra ports, the cache link is provided with no additional cost to the controller module.

The invention provides a RAID controller comprising: a host input/output circuit;

a cache memory; a processor electrically connected to the host input/output circuit and the cache memory; and a first serial attached SCSI (SAS) or serial ATA (SATA) input/output (I/O) circuit, the first SAS/SATA I/O circuit connected or connectable to a plurality of hard disks and a second SAS/SATA I/O circuit in a second RAID controller. Preferably, the first SAS/SATA I/O circuit includes at least four SAS/SATA I/O ports, each of the SAS/SATA I/O ports comprising a SAS/SATA transceiver, and wherein a first plurality of the SAS/SATA I/O ports are connected to the plurality of hard disks and a second plurality of the SAS/SATA I/O ports are connected to the second SAS/SATA I/O circuit. Preferably, the RAID controller is adapted to communicate with the hard drives in active-active mode with the second RAID controller. Preferably, the SAS/SATA I/O circuit is capable of communicating at a rate of 500 Megabytes/second or more.

In another aspect, the invention provides a RAID system comprising a plurality of hard disk drives; a first RAID controller and a second RAID controller, each of the RAID controllers including a cache memory, and each of the RAID controllers electrically connected to the plurality of hard disk drives; a first serial attached SCSI (SAS) or serial ATA (SATA) input/output (I/O) circuit associated with the first RAID controller and a second SAS/SATA I/O circuit associated with the second RAID controller; and the first SAS/SATA I/O circuit electrically connected to the second SAS/SATA I/O circuit. Preferably, the first SAS/SATA I/O circuit includes a first plurality of SAS/SATA ports and the second SAS/SATA I/O circuit includes a second plurality of SAS/SATA ports, and wherein each SAS/SATA port in the first plurality of SAS/SATA ports is connected to one of the SAS/SATA ports in the second plurality of SAS/SATA ports. Preferably, the first SAS/SATA I/O circuit comprises a first SAS/SATA I/O chip and the second SAS/SATA I/O circuit includes a second SAS/SATA I/O chip. Preferably, the first plurality of SAS/SATA ports is on the first SAS/SATA I/O chip and the second plurality of SAS/SATA ports is on the second SAS/SATA I/O chip. Preferably, the first SAS/SATA I/O circuit includes a first SAS/SATA I/O chip having a first SAS/SATA I/O port and a second SAS/SATA I/O chip having a second SAS/SATA I/O port, and the second SAS/SATA I/O circuit includes a third SAS/SATA I/O chip having a third SAS/SATA I/O port and a fourth SAS/SATA I/O chip having a fourth SAS/SATA I/O port, and the first SAS/SATA I/O port is connected to the third SAS/SATA I/O port and the second SAS/SATA I/O port is connected to the fourth SAS/SATA I/O port. Preferably, each of the SAS/SATA I/O ports includes a SAS/SATA transceiver. Preferably, the plurality of disk drives includes a first plurality of hard disk drives and a second plurality of disk drives, each of the first SAS/SATA I/O chip and the third SAS/SATA I/O chip is connected to the first plurality of disk drives and each of the second I/O chip and the fourth I/O chip is connected to the second plurality of hard disk drives. Preferably, the RAID controller further includes a RAID system backplane and the first and third SAS/SATA I/O ports and the second and fourth SAS/SATA I/O ports are connected via the RAID system backplane. Preferably, the first SAS/SATA I/O circuit and the second SAS/SATA I/O circuit are connected to the RAID system backplane. Preferably, the first SAS/SATA I/O circuit includes a first SAS/SATA transceiver and the second SAS/SATA I/O circuit includes a second SAS/SATA transceiver, and the first SAS/SATA transceiver is electrically connected to the second SAS/SATA transceiver.

The invention further provides a method of cache synchronization between a first RAID controller and a second RAID controller, the method comprising: providing a first SAS/SATA port in the first RAID controller and a second SAS/SATA port in the second RAID controller; and cache synchronizing the two controllers via the first and second SAS/SATA ports. Preferably, the providing comprises providing a first pair of SAS/SATA ports in the first RAID controller and providing a second pair of SAS/SATA ports in the second RAID controller, and the cache synchronizing comprises cache synchronizing the two controllers via the first pair of SAS/SATA ports and the second pair of SAS/SATA ports.

In yet another aspect, the invention provides a method of designing a RAID controller, the method comprising: providing in the design at least one SAS/SATA I/O chip including at least three SAS/SATA ports; designing the RAID controller for connecting a plurality of the SAS/SATA ports to a hard drive disk drive; and adapting the design of the RAID controller for connecting at least one of the SAS/SATA ports to a second RAID controller. Preferably, the providing comprises providing in the design two SAS/SATA I/O chips each having a plurality of SAS/SATA ports, and the adapting the design comprises adapting the design for connecting one port in each of the SAS/SATA I/O chips to a corresponding chip in the second RAID controller.

In still a further aspect, the invention provides a method of controlling data flow to a plurality of hard drives, the method comprising: providing at least three SAS/SATA ports; directing data flow to the hard drives via at least two of the SAS/SATA ports; and cache synchronizing a pair of RAID controllers via at least one of the SAS/SATA ports. Preferably, the providing comprises providing at least four SAS/SATA ports, and the cache synchronizing comprises synchronizing the pair of RAID controllers via two of the SAS/SATA ports.

Since the link between the controllers essentially determines the throughput of the RAID system, the extremely high speed of the SAS/SATA link according to the invention provides a RAID system that is overall faster than prior art RAID systems. Furthermore, this is accomplished while significantly lowering the overall cost of the controller. Numerous other features, objects and advantages of the invention will become apparent from the following description when read in conjunction with the accompanying drawings.

DETAILED DESCRIPTION OF THE PREFERRED EMBODIMENT

Figure 1:
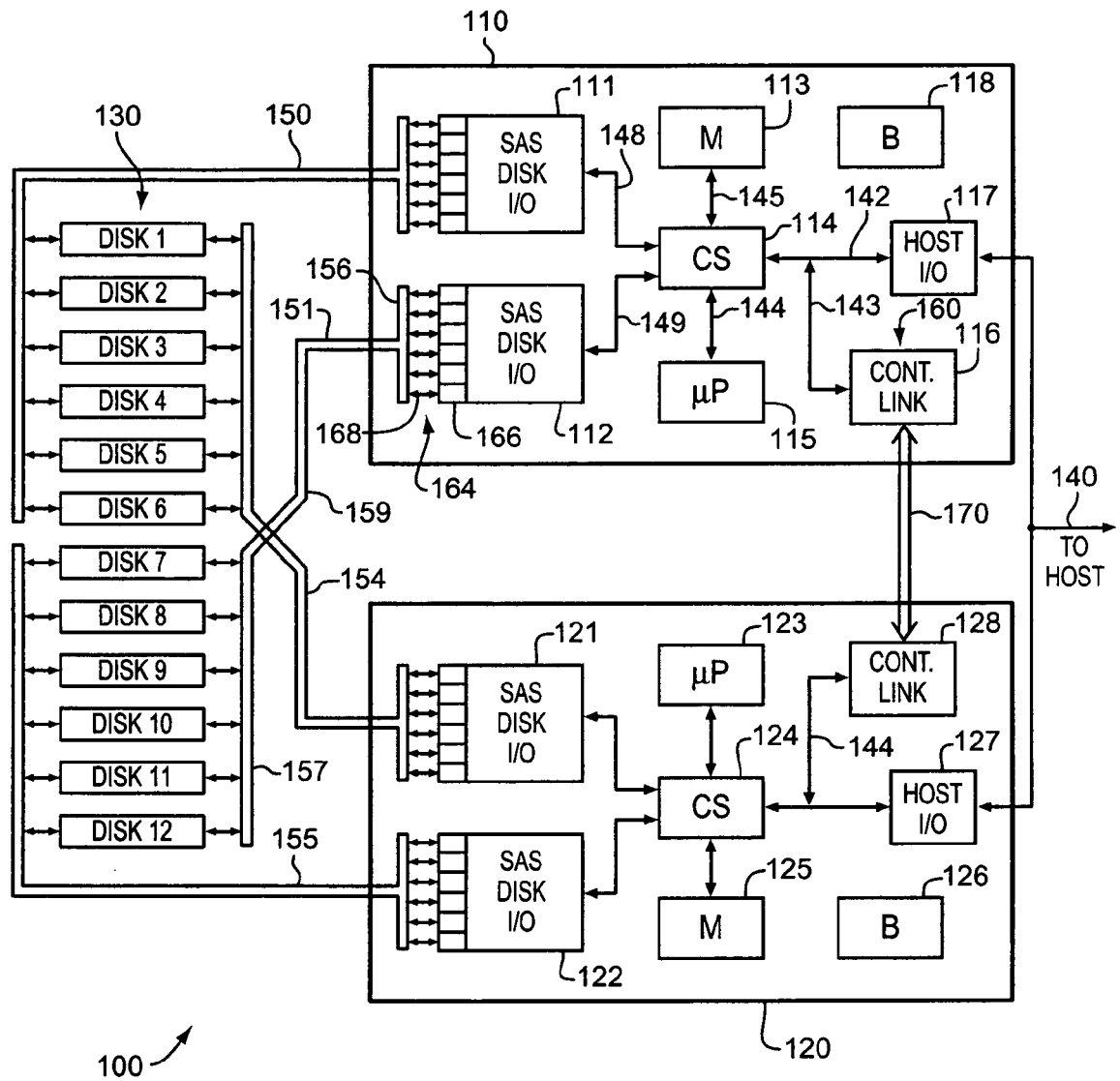
FIG. 1 is an electrical circuit diagram of the closest prior art RAID system.
Figure 2:
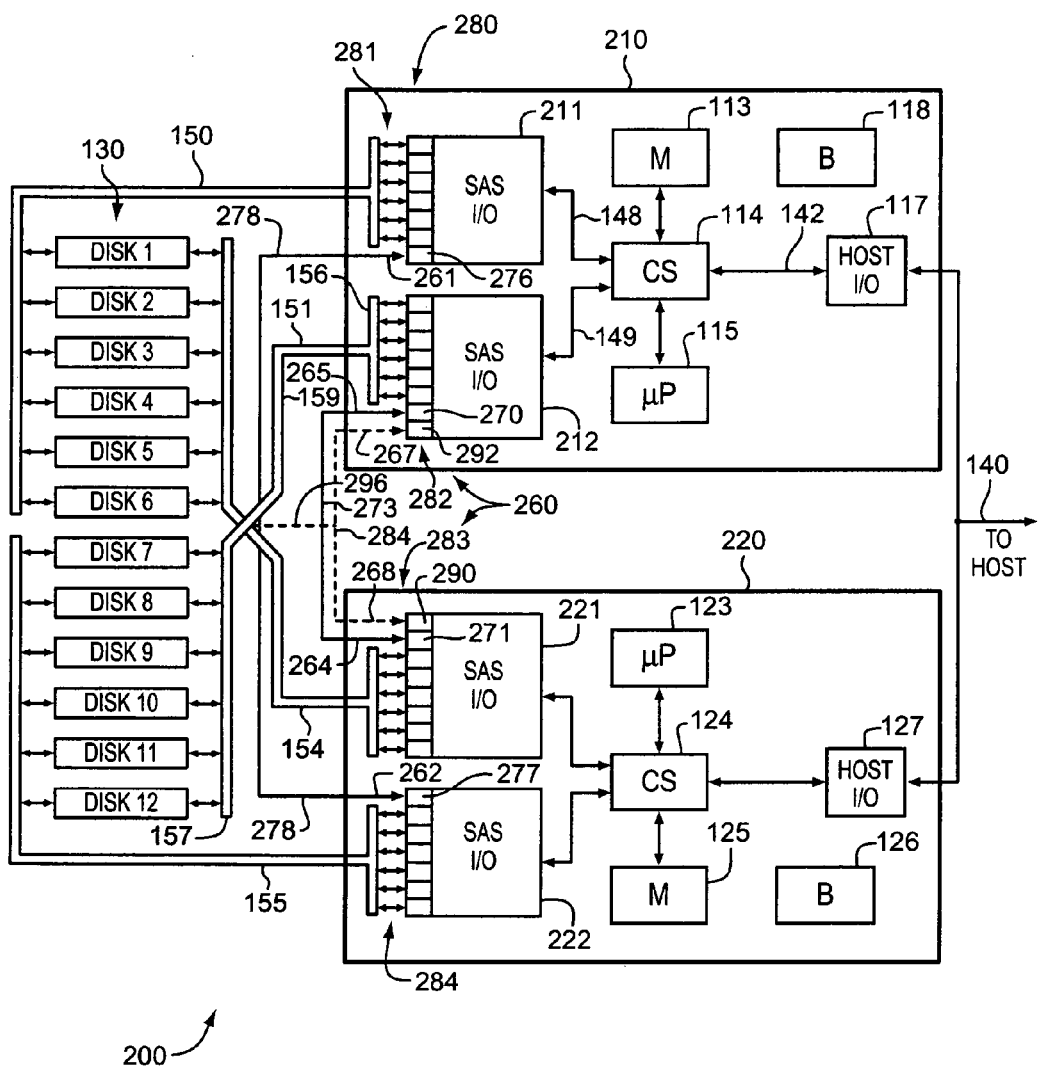
FIG. 2 is an electrical circuit diagram of the preferred embodiment of a RAID system according to the invention.

Directing attention to FIG. 2, a preferred embodiment of a RAID system 200 according to the invention is shown. It should be understood that the specific system 200 is exemplary, and not intended to limit the invention except as specified in the claims below. In FIG. 2, the elements that are identical to elements in the prior art system 100 are denoted with the same numerals. However, it should be understood that each of these elements are exemplary only, and that different elements may be selected. The same elements are used only to better point out the invention.

In the system 200 according to the invention, twelve hard disks, labeled "disk 1" through "disk 12" are shown. However, it is understood that the system can have a greater or lesser number of disks. The system 100 includes two controllers, 210, 220, though a larger number is possible. Each controller, such as 210, includes a pair of SAS I/O chips 211, 212, though one I/O chip or more than two I/O chips may be used. Each controller, such as 210, includes a cache memory 113, a processor 115, a controller chip set 114, a host I/O chip 117, and a battery 118, though not all of these parts are required, and/or equivalent elements or circuits may be used. In the preferred embodiment, memory 113 is a RAM memory and processor 115 is a microprocessor, though other equivalent elements may be used. As in the prior art system 100, the host I/O chip is connected to a host computer via cabling 140, and the disks 130 are connected to the controllers 210 and 220 via SAS ports 280. Each SAS I/O chip, such as 212, is connected to a plurality of disks, such as disks 7 through 12, via a plurality of SAS ports such as 282, and electrical connections, such as 151, including appropriate SAS connectors 156 and 157.

Each SAS I/O chip, 211, 212, 221, and 222 includes a plurality of SAS ports 281, 282, 283, and 284, respectively, each port including a transceiver, such as 270. In the system according to the invention, at least one of the SAS I/O chips in each controller, such as 212 and 221, includes additional SAS ports, 270, 271, respectively, that are not used for communication with disks 130, but instead are used as part of the controller cache link 260.

Two different embodiments of a controller link 260 are shown in FIG. 2. In one embodiment, one port of each SAS I/O chip in controller 210 is connected to one port of a corresponding SAS I/O chip in controller 220. That is, port 261 of SAS I/O chip 211 in controller 210 is connected to port 262 of SAS I/O chip 222 via a SAS connection 278, and port 265 of SAS I/O chip 212 is connected to port 264 of SAS I/O chip 221 via a SAS connection 273. In an alternative embodiment, two ports 265 and 267 of one SAS I/O chip, such as 212, in controller 210 are connected to two ports 264 and 268, respectively, of one SAS I/O chip, such as 221, in controller 220 via SAS connections 273 and 294, respectively. Connection 294 is shown in ghost because it does not exist in the first embodiment. The first embodiment is preferred because it has better redundancy. In each of the preferred embodiments, two SAS ports in controller 210 are connected to two ports in controller 220. However, more or less SAS ports could be used for the link 260. As shown in FIG. 2, each of the ports 261, 262, 265, 264, 267, and 268 include a SAS transceiver 276, 277, 270, 271, 292, and 290, respectively. Preferably, the SAS connections 278, 273, and 294 are routed through the RAID system backplane indicated by the dotted line 296.

Figure 3:
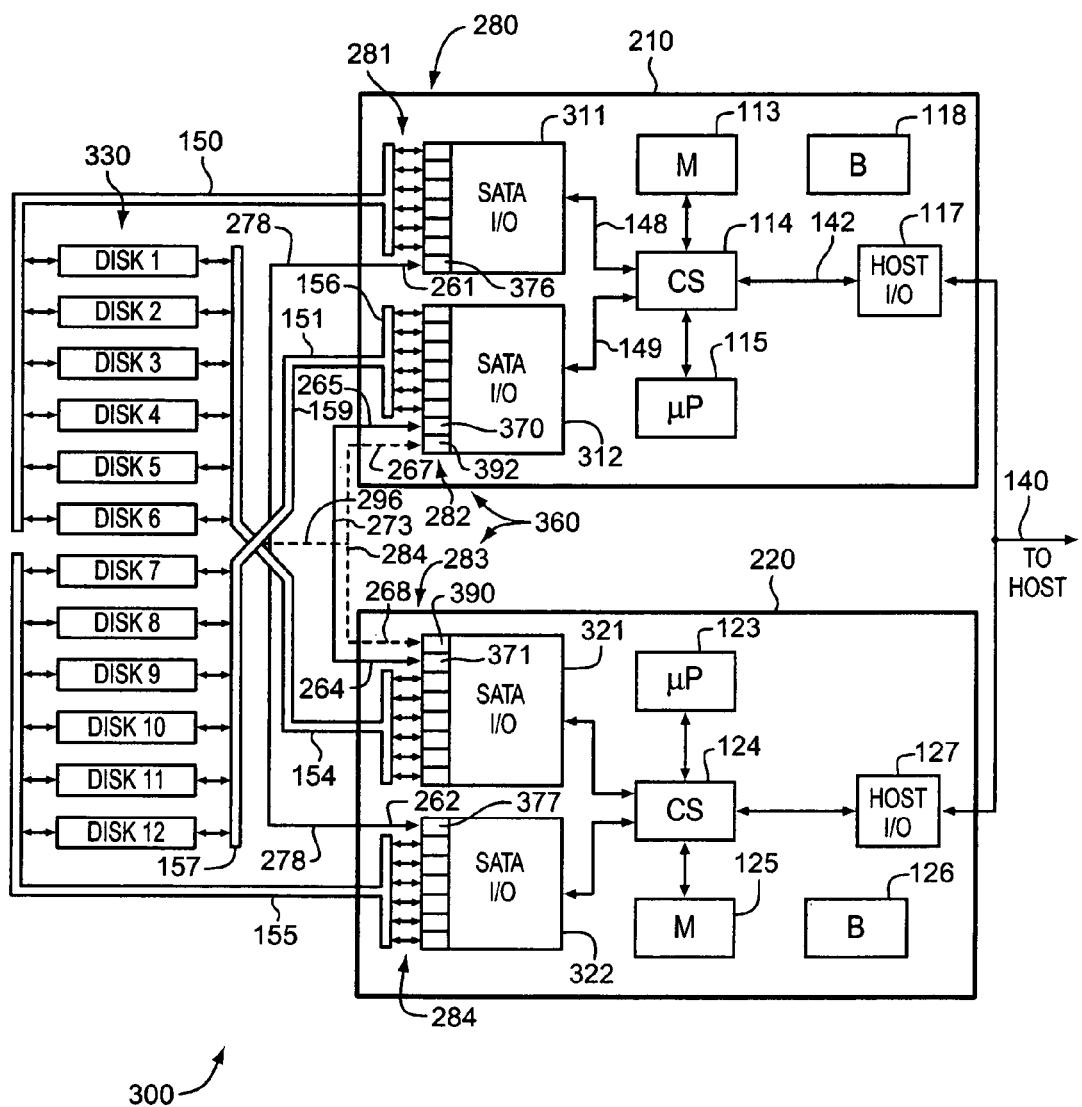
FIG. 3 is an electrical circuit diagram of another preferred embodiment of a RAID system according to the invention.

FIG. 3 shows another embodiment of the system 300 according to the invention. In this embodiment, the controller cache link 360 is a serial ATA (serial Advanced Technology Attachment) link, commonly referred to as SATA. The SATA link will preferably be used when the disk drives 330 are SATA drives rather than SAS drives 230. The system 300 is the same as the system 200 of FIG. 2, except that the SAS I/O chips 211, 212, 221, and 222 are replaced with SATA I/O chips 311, 312, 321, and 322, respectively. In this embodiment, transceivers 376, 370, 392, 390, 371, and 377 are SATA transceivers. Since backplane 296, cabling 150, connectors 278, ports 281, etc., are the same for SAS and SATA systems, the rest of the system is the same as that of FIG. 2, and will therefore not be repeated here.

Generally, the SAS system 200 is used in RAID systems in which high performance SCSI disks 130 are desirable, and the SATA system 300 is used in RAID systems in which lower cost bulk storage SATA drives are desirable. However, since the backplane and connectors are the same, it is possible to mix SAS and SATA systems, provided SAS communicates with SAS and SATA communicates with SATA.

In the discussion herein where the protocol or hardware can be either SAS or SATA, the term SAS/SATA is used. This is to indicate that the statement, claim, or other aspect of this disclosure is correct whether the SAS protocol, software, and hardware, the SATA protocol, software, and hardware, or a combination thereof is used.

The system 200, 300 according to the invention is significantly less costly than the system 100 of the prior art because it is significantly less costly to add additional ports to a SAS/SATA I/O chip than to add additional chips to a controller. Indeed, most manufacturers of SAS or SATA I/O chips produce a line of chips having different numbers of ports, and the cost of chips with additional ports is relatively small. For redundancy purposes, most RAID controllers are designed with extra ports on each I/O chip. Thus, the system may be implemented simply by utilizing the extra ports in the controller design to implement the cache synchronization.

In addition, the communication speed via the SAS/SATA ports is significantly faster than the communication through the prior art links. The two port links 260, 360 shown in the preferred embodiments provide approximately 600 Mbytes/sec of throughput for either the SAS or SATA embodiment. Thus, the invention provides a very high bandwidth cache synchronization system at little or no additional cost to the control module. The systems 200, 300 according to the invention are also more compact than prior art systems, requiring simpler and less complex connectors and cabling.

There has been described a RAID system and RAID controller that is faster than prior art systems and controllers, is less costly than prior art systems, more compact than prior art systems, and having numerous other novel features. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiment described, without departing from the inventive concepts. For example, a system that combines elements of the systems of FIG. 2 and FIG. 3 will also have significant advantages. The various elements of the controller and the electrical connections between the various elements can be varied widely. Equivalent structures may be substituted for the various structures described; the subprocesses of the inventive method may, in some instances, be performed in a different order; or a variety of different materials and electronic elements may be used. As just one possible variation, the host I/Os, 117 and 127, may include extra SAS/SATA ports, which may be used as ports for cache synchronization. Consequently, the invention is to be construed as embracing each and every novel feature and novel combination of features present in and/or possessed by the RAID system, RAID controller devices, and RAID methods described.

The invention claimed is:

1. A RAID system comprising:
   a host input/output circuit;
   a plurality of hard disk drives;
   a first RAID controller and a second RAID controller, each of said RAID controllers including a cache memory, and each of said RAID controllers electrically connected to said plurality of hard disk drives;
   in each of said RAID controllers, a processor electrically connected to said host input/output circuit and said cache memory; and
   a first serial attached SCSI (SAS) or serial ATA (SATA) (SAS/SATA) input/output (I/O) circuit associated with said first RAID controller, and a second SAS/SATA I/O circuit associated with said second RAID controller;
   wherein said first SAS/SATA I/O circuit includes a first SAS/SATA I/O chip having a first SAS/SATA I/O port and a second SAS/SATA I/O chip having a second SAS/SATA I/O port, and said second SAS/SATA I/O circuit includes a third SAS/SATA I/O chip having a third SAS/SATA I/O port and a fourth SAS/SATA I/O chip having a fourth SAS/SATA I/O port, and wherein said first SAS/SATA I/O port is connected to said third SAS/SATA I/O port and said second SAS/SATA I/O port is connected to said fourth SAS/SATA I/O port;
   wherein said plurality of disk drives includes a first plurality of hard disk drives and a second plurality of disk drives, each of said first SAS/SATA I/O chip and said third SAS/SATA I/O chip is connected to said first plurality of disk drives, and each of said second I/O chip and said fourth I/O chip is connected to said second plurality of hard disk drives.

2. A RAID controller as in claim 1 wherein said first SAS/SATA I/O circuit includes at least four SAS/SATA IO ports, each of said SAS/SATA I/O ports comprising a SAS/SATA transceiver, and wherein a first plurality of said SAS/SATA I/O ports are connected to said plurality of hard disks and a second plurality of said SAS/SATA I/O ports are connected to said second SAS/SATA I/O circuit.

3. A RAID controller as in claim 1 wherein said RAID controller is adapted to communicate with said hard drives in active-active mode with said second RAID controller.

4. A RAID controller as in claim 1 wherein said SAS/SATA I/O circuit is capable of communicating at a rate of 500 Megabytes/second or more.

5. A RAID system comprising:
   a plurality of hard disk drives;
   a first RAID controller and a second RAID controller, each of said RAID controllers including a cache memory, and each of said RAID controllers electrically connected to said plurality of hard disk drives;
   a first serial attached SCSI (SAS) or serial ATA (SATA) (SAS/SATA) input/output (I/O) circuit associated with said first RAID controller and a second SAS/SATA I/O circuit associated with said second RAID controller; and
   said first SAS/SATA I/O circuit directly electrically connected to said second SAS/SATA I/O circuit;
   wherein said first SAS/SATA I/O circuit includes a first plurality of SAS/SATA ports and said second SAS/SATA I/O circuit includes a second plurality of SAS/SATA ports, and wherein each said SAS/SATA port in said first plurality of SAS/SATA ports is connected to one of said SAS/SATA ports in said second plurality of SAS/SATA ports,
   wherein said first SAS/SATA I/O circuit includes a first SAS/SATA I/O chip having a first SAS/SATA I/O port and a second SAS/SATA I/O chip having a second SAS/SATA I/O port, and said second SAS/SATA I/O circuit includes a third SAS/SATA I/O chip having a third SAS/SATA I/O port and a fourth SAS/SATA I/O chip having a fourth SAS/SATA I/O port, and
   wherein said first SAS/SATA I/O port is connected to said third SAS/SATA I/O port and said second SAS/SATA I/O port is connected to said fourth SAS/SATA I/O port, and wherein said plurality of disk drives includes a first plurality of hard disk drives and a second plurality of disk drives, each of said first SAS/SATA I/O chip and said third SAS/SATA I/O chip is connected to said first plurality of disk drives, and each of said second I/O chip and said fourth I/O chip is connected to said second plurality of hard disk drives.

6. A RAID controller as in claim 5 wherein each of said SAS/SATA I/O ports includes a SAS/SATA transceiver.

7. A RAID controller as in claim 5 wherein said first SAS/SATA I/O circuit includes a first SAS/SATA transceiver and said second SAS/SATA I/O circuit includes a second SAS/SATA transceiver, and said first SAS/SATA transceiver is electrically connected to said second SAS/SATA transceiver.

8. A method of cache synchronization between a first RAID controller and a second RAID controller, said method comprising:
   providing a first RAID controller and a second RAID controller;
   connecting said first RAID controller to each of a plurality of hard drives and connecting said second RAID controller to each of said plurality of hard drives;
   providing a first SAS/SATA port in said first RAID controller and a second SAS/SATA port in said second RAID controller; and
   cache synchronizing said two controllers via direct electrical connection between said first and second SAS/SATA ports.

9. A method as in claim 8 wherein said providing comprises providing a first pair of SAS/SATA ports in said first RAID controller and providing a second pair of SAS/SATA ports in said second RAID controller, and said cache synchronizing comprises cache synchronizing said two controllers via said first pair of SAS/SATA ports and said second pair of SAS/SATA ports.

10. A method of controlling data flow to a plurality of hard drives, said method comprising:
   providing a first RAID controller and a second RAID controller;
   connecting said first RAID controller to each of said plurality of hard drives and connecting said second RAID controller to each of said plurality of hard drives;
   providing at least three SAS/SATA ports in each of said RAID controllers;
   directing data flow to said hard drives via at least two of said SAS/SATA ports in each of said RAID controllers; and
   cache synchronizing said first and second RAID controllers via a direct electrical connection between at least one of said SAS/SATA ports in each of said RAID controllers.

11. A method as in claim 10 wherein said providing comprises providing at least four SAS/SATA ports, and said cache synchronizing comprises synchronizing said first and second RAID controllers via two of said SAS/SATA ports in each of said RAID controllers.

* * * * *